J. Bolton,
Tuck-Greaser.

No. 4196. Reissued Dec. 13. 1870.

Witnesses
W. L. Demmon.
Charles H. Yerga

Inventor
James Bolton
by his atty.
A. S. Renwick

United States Patent Office.

JAMES BOLTON, OF CHICAGO, ILLINOIS, ASSIGNOR TO THE SINGER MANUFACTURING COMPANY.

Letters Patent No. 46,871, dated March 21, 1865; reissue No. 4,196, dated December 13, 1870.

IMPROVEMENT IN TUCK-CREASING DEVICES FOR SEWING-MACHINES.

The Schedule referred to in these Letters Patent and making part of the same.

*To all whom it may concern:*

Be it known that I, JAMES BOLTON, of Chicago, in the county of Cook and State of Illinois, have made an invention of a new and improved Tuck-Marker or Creaser for Sewing-Machines; and I do hereby declare that the following is a full, clear, and exact description thereof.

Previous to my invention the cloth sewed in a sewing-machine has been creased for the formation of a tuck by the joint action of a blunt knife-edge or spur, and a fork, the creasing being effected by nipping the cloth between the said two instruments by the reciprocating movement of one of them relatively to the other.

The objects of my invention are to enable such creasing-instruments to be readily applied to and disconnected from a sewing-machine; also to enable the two creasing-instruments to be adjusted simultaneously, and to permit the movable creasing-instrument to be adjusted at any desired distance from the needle without breaking its connection with the part of the sewing-machine that imparts movement to it; to this end My invention consists of a creasing tuck-marker, consisting of a blunt knife-edge or spur, a cloven foot or fork, and a stock, the whole combined so as to constitute a complete implement or attachment for a sewing-machine, having its members permanently connected with each other, so that the two creasing-instruments can be adjusted simultaneously in any desired position relatively to the needle, and that the implement can be readily secured to and disconnected from the sewing-machine.

My invention consists further of the combination of the movable member of a tuck-marker with a sliding bracket, which being secured to a reciprocating part of a sewing-machine, permits the arm of the said movable member to be slid through it (said bracket) and adjusted without the necessity of being disconnected from the said reciprocating part.

In order that my invention may be fully understood, I have represented in the accompanying drawing and will proceed to describe a tuck-marker embodying my invention in the best form known to me at the date of my invention.

The same letters of reference indicate the same parts in all the figures.

Figure 1:
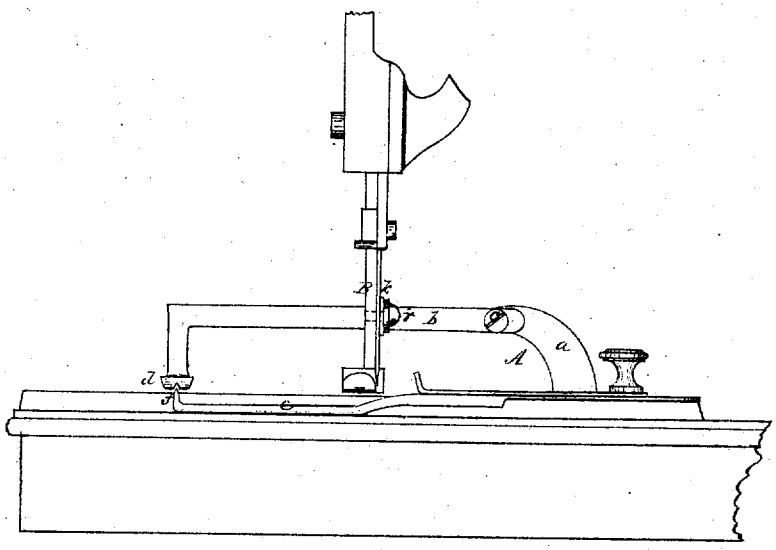
Figure 1 is a side elevation of the tuck-marker and of the adjacent parts of a sewing-machine to which said implement is applied.
Figure 3:
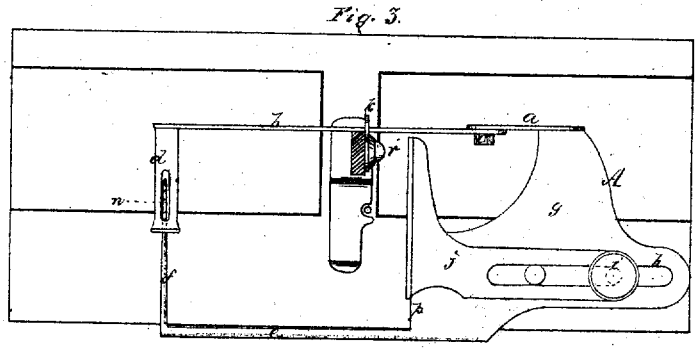
Figure 3 is a plan of the tuck-marker.
Figure 2:
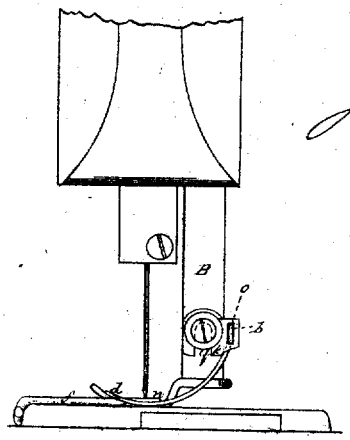
Figure 2 is a transverse sectional view of the same taken behind or to the right of the presser-bar in fig. 1.

The tuck-marker consists essentially of two creasing-instruments, the one of which, *n*, has the form of a blunt knife-edge or spur, and the other, *d*, has the form of a cloven foot or fork, the cleft of which is directly opposite the spur *n*, so that the cloth is creased or marked by being pressed into the cleft of the foot or fork by the blunt edge of the spur. These two instruments are combined with the stock *g*, whose under side is flat so that it may lie upon the table of the sewing-machine.

One of the instruments, the spur *n*, in this instance, is rigidly connected with the stock *g* by a bent arm *e f*, so that the spur may be operating at one side of the needle while the stock *g* is at the opposite side thereof, and the connecting-arm *e f*, is sufficiently long to permit the cloth to be creased at the greatest required distance from the needle. The other instrument, the cloven foot *d*, in this instance, is connected with the stock *g* in such manner that the said instrument may be moved toward and from the first instrument; and the means of connection which I prefer for this purpose is a hinge pivot, *c*. The stock *g* is perforated to permit the passage of a clamp-screw, *i*, by means of which the implement may be secured to the table of the sewing-machine, and the construction of the perforation in the form of a slot, *h*, permits the implement to be set with its creasing-instruments at a greater or lesser distance from the needle, as required to mark a tuck of greater or lesser breadth.

As the three members before described, viz, the blunt knife-edge or spur, the cloven foot or fork, and the stock, are all permanently connected together, they constitute a complete implement or attachment for a sewing-machine, which can be readily applied to and removed from it without changing the relationship of the members of which it is composed.

In order that the two creasing-instruments may be intermittently separated and caused to approach each other, the upper one, *d*, is connected with some reciprocating part of the sewing-machine; and, when said machine has a four-motion reciprocating feed, the part that I prefer to make the connection with is the shank B of the presser-foot, or the presser-bar, as it is sometimes called. In order that the tuck-marker may be readily adjusted to different positions, notwithstanding its connection with the reciprocating part of the sewing-machine, the connection is made by means of a slotted bracket, *k*, having a slot, *o*, of sufficicent size to permit the arm *b* of the movable member *d* to slip readily through it.

The bracket is also perforated to permit the passage of a screw, *r*, by means of which the bracket is secured to the reciprocating part of the sewing-machine, and I prefer to form the perforation for this purpose in the form of an open slot, *q*, so as to enable me to secure the bracket *k* to the sewing-machine without withdrawing the clamp-screw *r*, and to set the bracket at any desired height on the presser-bar, according to the lateral adjustment of the tuck-marker upon the table or bed-plate for the width of the tuck. When the bracket *k* is fixed to the presser-bar, the arm *b* of the marker being carried in said bracket reciprocates with the presser-bar; that is, when the marker is used on a sewing-machine, which has a reciprocating feed, so called, the said arm *b* moving freely upon its pivot *c*. The material being sewed lies upon and moves over the arm *e f*, and, at every advance of the feed, the fork or foot *d* of the marker is raised off the material with the rising of the presser-bar, and afterward borne down by the said bar and pressed upon the material while the needle is making another stitch, the material being crimped between the cleft in the fork *d* and the spur *n*, so that the place for the tuck is marked step by step in a line parallel with the seam or perforations by the needle.

The width of the tuck is determined by the adjustment of the two creasing-instruments simultaneously to a greater or lesser distance from the needle by adjusting the attachment on the bed-plate.

A gauge to guide the edge of the material may be made, if desired, along the edge *p* of the stock *g* of the tuck-marker; but it will be found most convenient to use an independent gauge, *j*, which may be secured to the sewing-machine above the stock *g* of the tuck-marker by the same set-screw, *i*, which secures the marker to the table.

When a narrow tuck is to be made, the spur and fork are moved to the right a suitable distance, and the extent of the reciprocating movement of the fork, or, in other words, the extent of its vibration is correspondingly lessened, according to the distance of the fork from the presser-arm. The movement imparted to the fork by the presser-bar when the former is near the latter and is marking for a narrow tuck, is sufficient for successful operation, because the material which is being sewed is held and advanced smoothly beneath the fork for a considerable distance to one side of the line of sewing by the joint operation of the feeding devices and the needle; but when the tuck is to be wide, the extent of the vibrating movement of the moving creasing-instrument needs to be greater, because that portion of the material which lies at a considerable distance at one side of the seam has a tendency to drag or lag behind the advance of the seam, unless it is held extended and smooth by the hand of the operator or by some other means. It is therefore expedient that the moving creasing-instrument be raised sufficiently at each movement of the feed to clear the material. This is accomplished by my invention, because the adjustment of the implement upon the bed-plate of the machine places the joint of the movable arm *b* at a lesser or greater distance from the slotted bracket *k*, and consequently the same reciprocating movement of the bracket causes the movable creasing-instrument to rise reciprocally more or less.

What I claim as my invention, and desire to secure by Letters Patent, is—

1. The creasing tuck-marker hereinbefore described, consisting substantially of the spur, the fork, and the stock, all permanently connected, so as to constitute a removable attachment for sewing-machines.

2. The combination of the arm of the movable member of a tuck-marker with a movable bracket, by which the said arm may be connected with a reciprocating member of the sewing-machine, substantially as before set forth.

In testimony whereof, I have hereto set my hand this 12th day of September, 1870.

JAMES BOLTON.

Witnesses:
H. N. ELDRIDGE,
F. W. TOURTELLOTTE.